United States Patent
Dexel

(10) Patent No.: US 6,427,885 B1
(45) Date of Patent: Aug. 6, 2002

(54) SPARE TIRE LOCK AND LUG WRENCH PLACEMENT DEVICE

(76) Inventor: Dennis D. Dexel, 21415 Hwy. 140, Hesperus, CO (US) 81326

( * ) Notice: Subject to any disclaimer, the term of this patent is extended or adjusted under 35 U.S.C. 154(b) by 0 days.

(21) Appl. No.: 09/552,548

(22) Filed: Apr. 19, 2000

Related U.S. Application Data

(63) Continuation-in-part of application No. 09/421,512, filed on Oct. 20, 1999, now abandoned.

(51) Int. Cl.[7] ................................................. B60R 7/00
(52) U.S. Cl. ................... 224/42.24; 224/42.25; 224/42.26; 224/42.3; 70/259
(58) Field of Search .......................... 224/42.24, 42.25, 224/42.26, 42.3; 70/258, 259

(56) References Cited

U.S. PATENT DOCUMENTS

| | | | |
|---|---|---|---|
| 2,711,274 A | * 6/1955 | Stephans | 224/42.24 |
| 2,831,622 A | * 3/1958 | Bacca | 224/42.24 |
| 3,613,972 A | * 10/1971 | Duaghhetee | 224/42.24 |
| 3,688,954 A | * 9/1972 | Neal | 224/42.24 |
| 3,843,033 A | * 10/1974 | Wirth, Sr. | 224/42.24 |
| 3,865,291 A | * 2/1975 | Tidwell | 224/42.24 |
| 4,007,863 A | * 2/1977 | Norris | 224/42.24 |
| 4,225,066 A | * 9/1980 | Barr | 224/42.24 |
| 4,294,088 A | * 10/1981 | Barr | 70/56 |
| 4,598,848 A | * 7/1986 | Clark | 224/42.24 |
| 4,751,833 A | * 6/1988 | Stumf, Jr. | 70/259 |
| 4,873,851 A | * 10/1989 | Arnett | 70/259 |
| 5,586,698 A | * 12/1996 | Satoh | 224/42.24 |

* cited by examiner

*Primary Examiner*—Stephen K. Cronin
(74) *Attorney, Agent, or Firm*—Albert O. Cota

(57) ABSTRACT

A spare tire lock and lug wrench placement device designed to be attached to a motor vehicle or trailer. The device includes a hollow wrench carrier body (20) having an extended shackle lock pin (24) with the body removably connected to a round threaded shaft (32). The shaft attaches to a slotted flange assembly (34) which in turn mounts directly to a spare wheel carrier (40) to accommodate various widths of spare tires. A shackle-less padlock (64) is permanently mounted in a locking cover (60) that slips over the body and captivates a four way lug wrench (54) using open ended slots (22) and (62) in the body and cover. The wrench is locked in place on the outside of the wheel and a emblem plate (56) covers the body and padlock which prevents theft of both the tire and wrench. A second embodiment replaces the locking cover with a conventional lock (70), having the U-shaped shackle permanently installed in a round body, (66) eliminating the use of a cover or emblem plate while functioning in the same manner. A third embodiment is for storage of the lug wrench on a bulkhead or vehicle wall by replacing the slotted flange with a bulkhead mounting plate (72) while using the other elements as described.

15 Claims, 6 Drawing Sheets

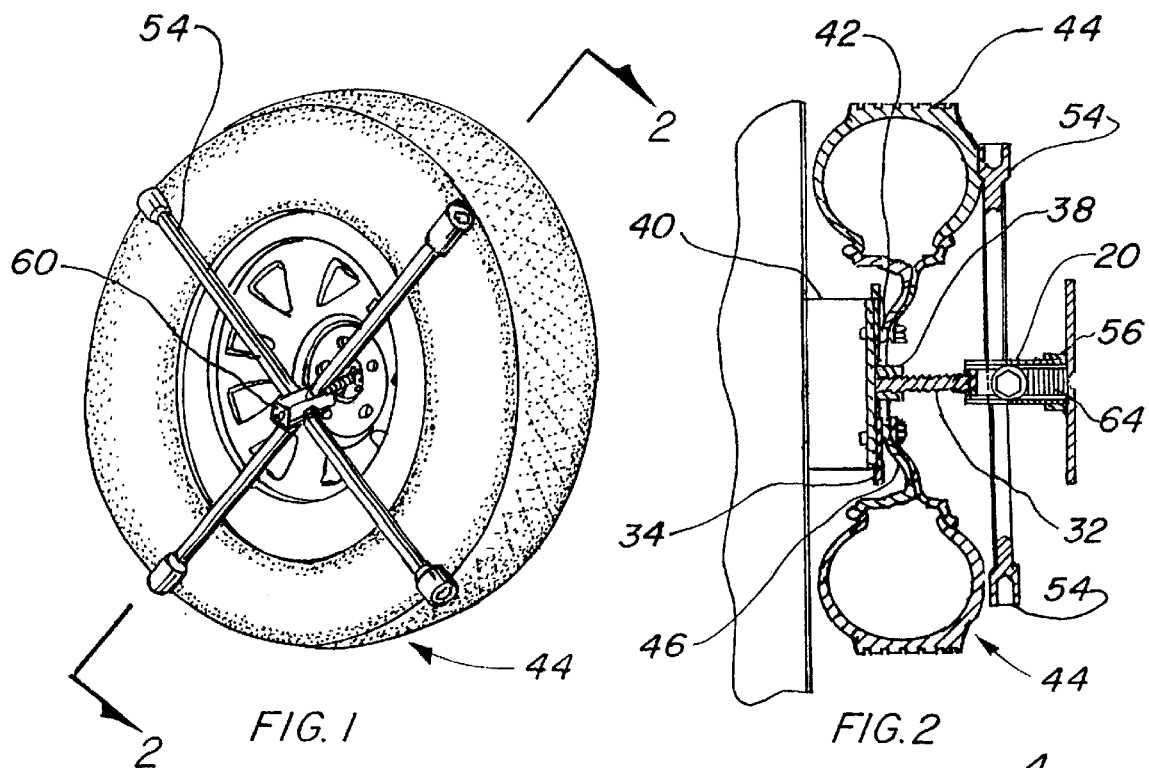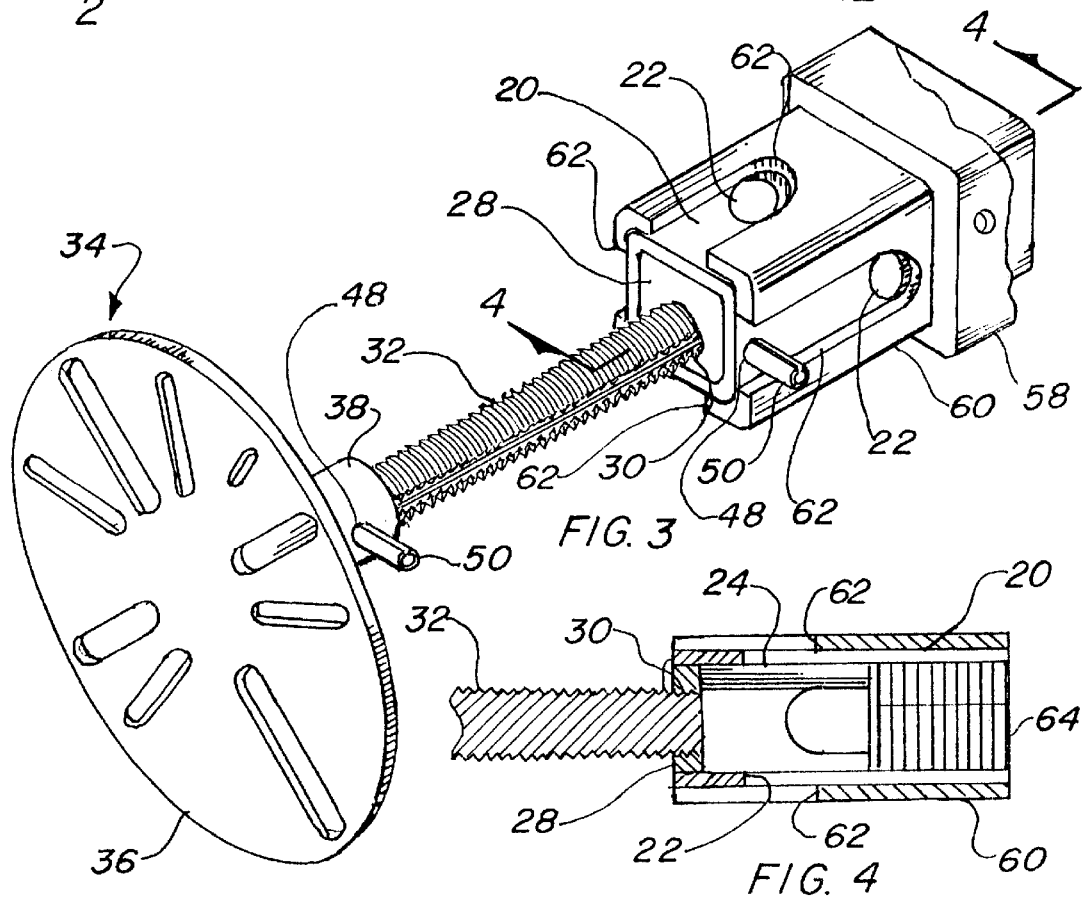

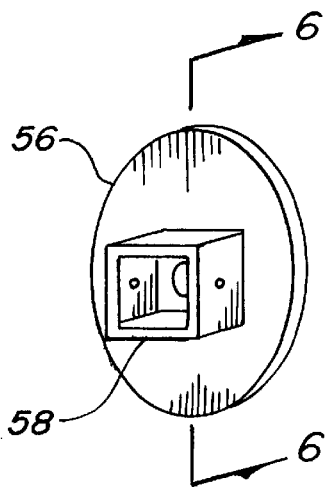
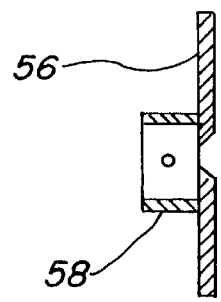
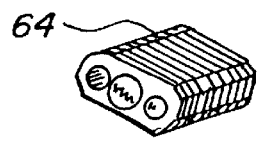
FIG. 5  FIG. 6  FIG. 7
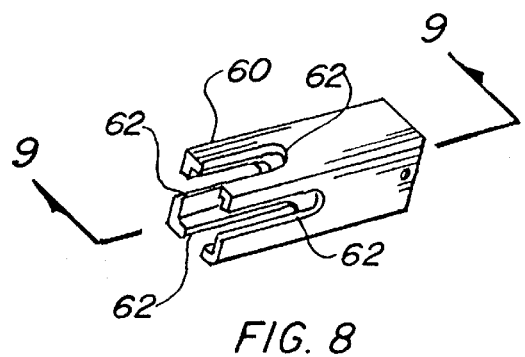
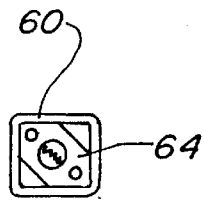
FIG. 8  FIG. 10
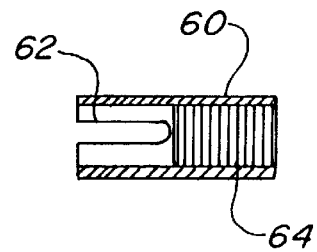
FIG. 9
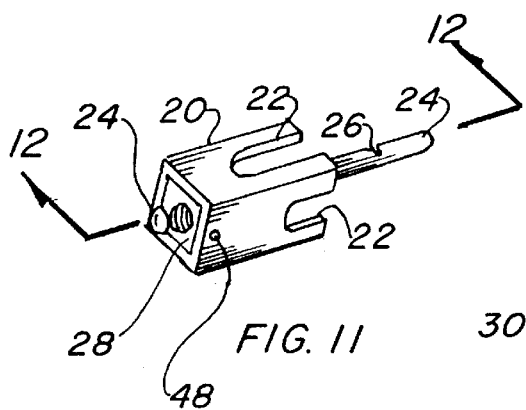
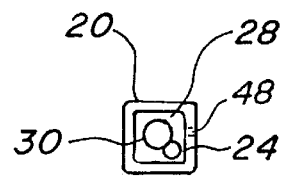
FIG. 11  FIG. 13
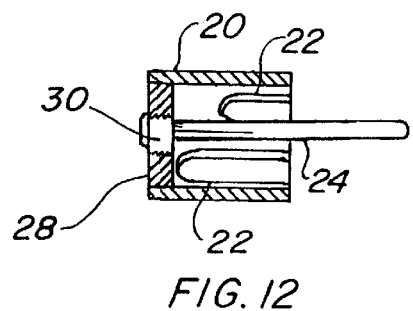
FIG. 12

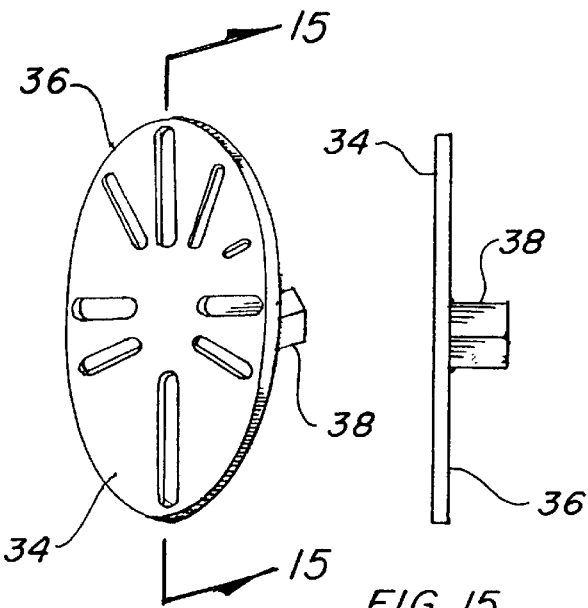
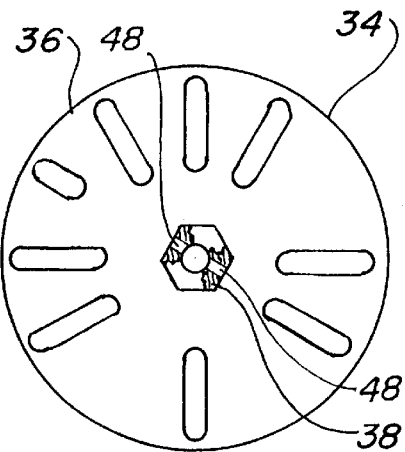
FIG. 14  FIG. 15  FIG. 16
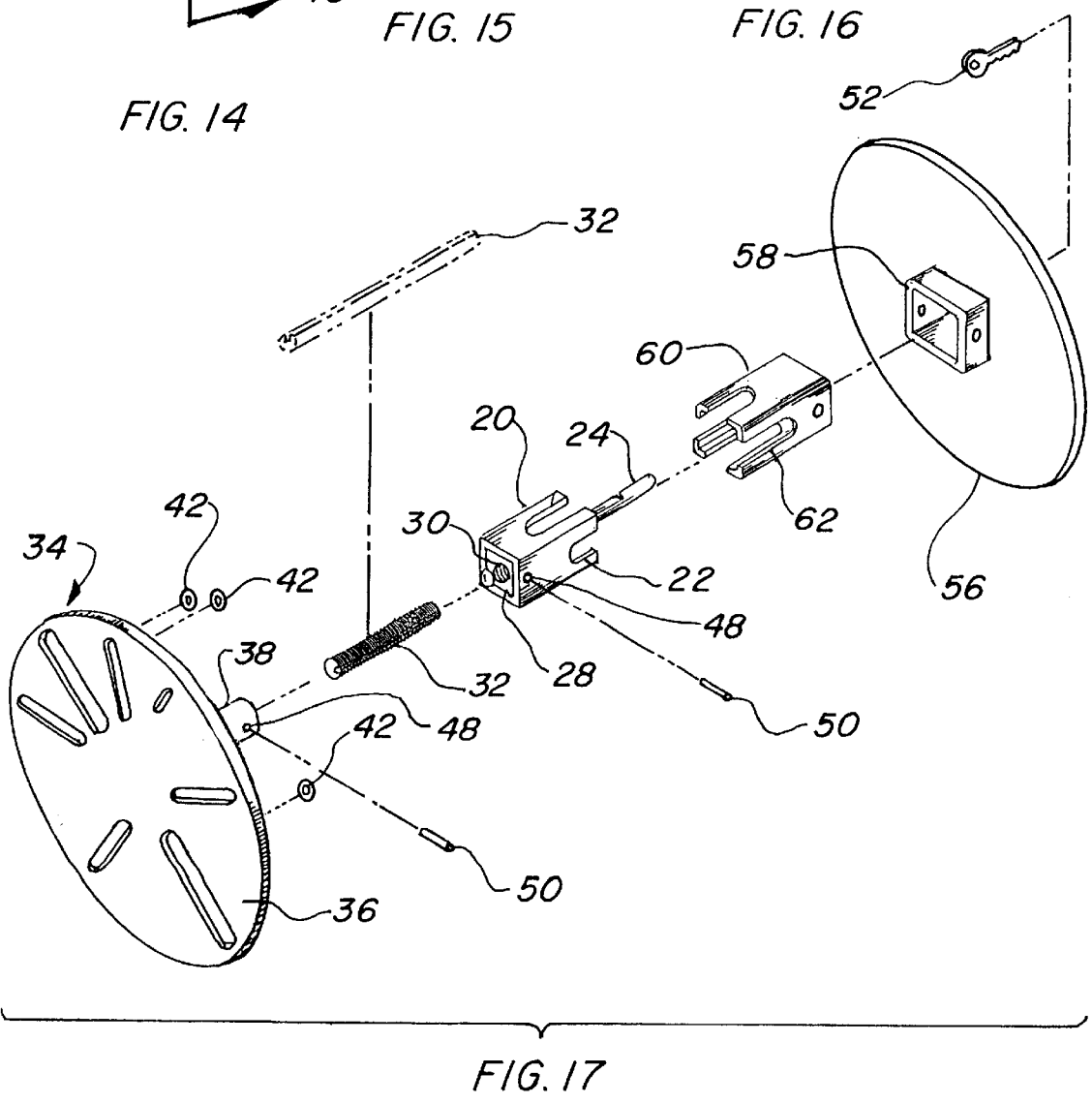
FIG. 17

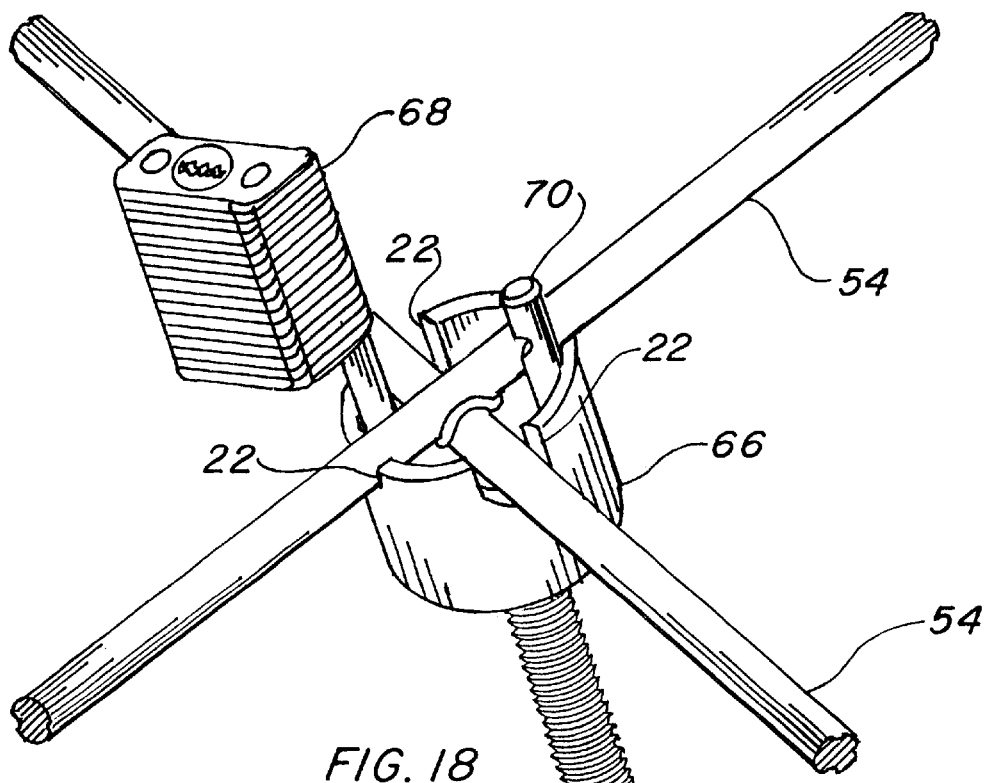
FIG. 18
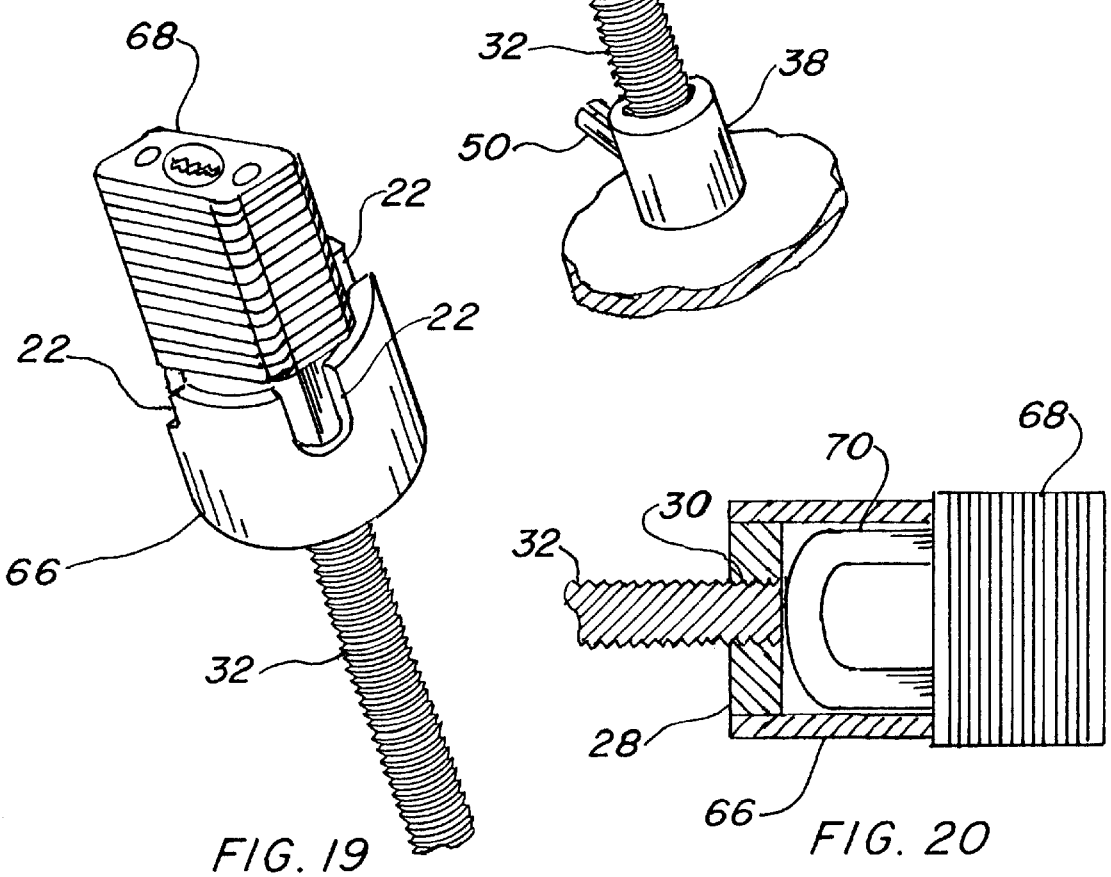
FIG. 19
FIG. 20

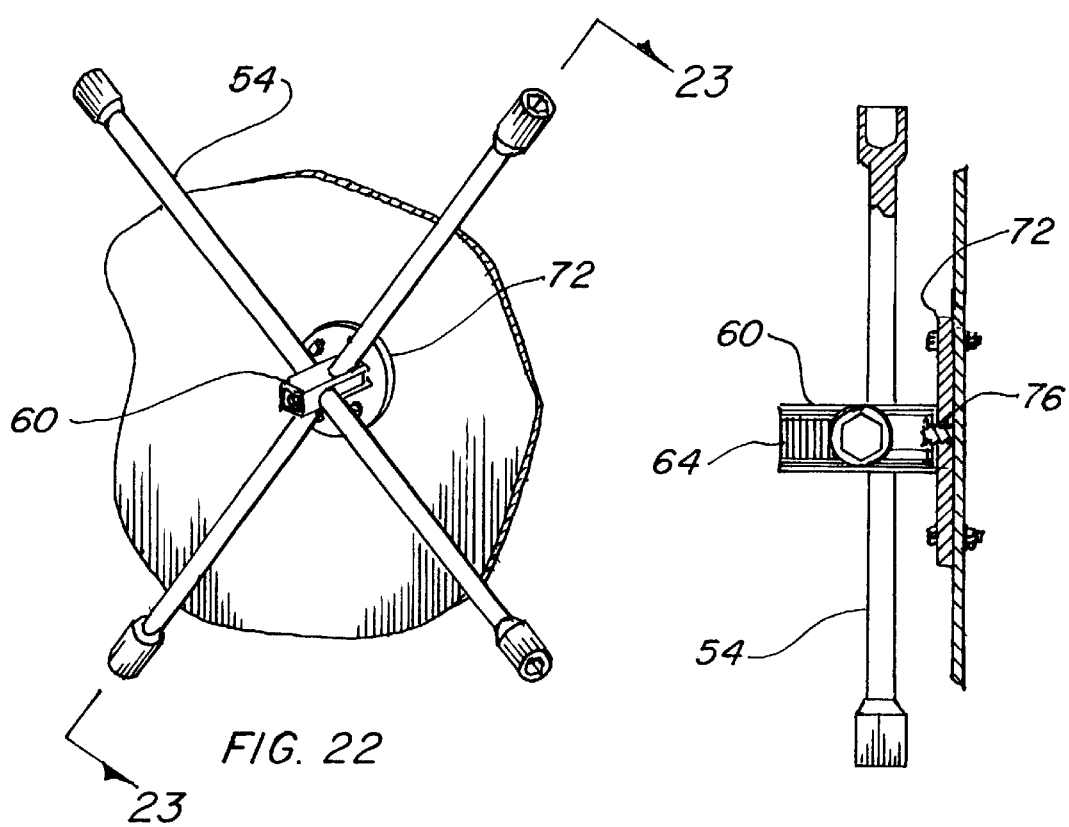
FIG. 22
FIG. 23
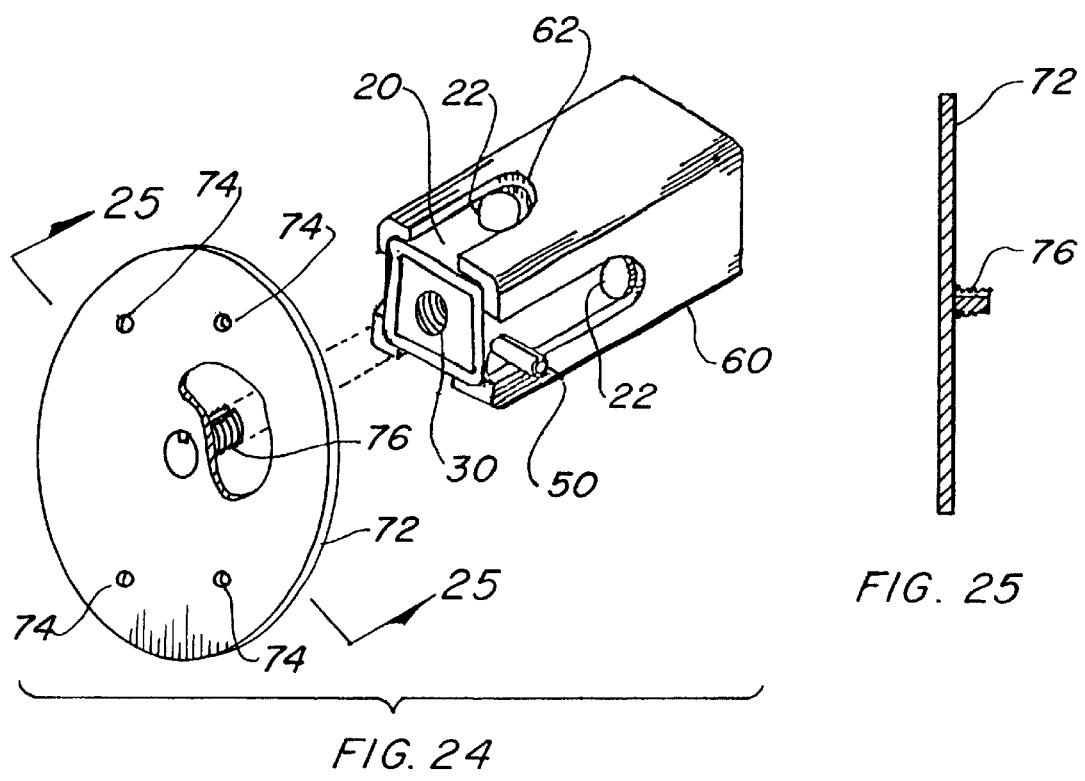
FIG. 24
FIG. 25

SPARE TIRE LOCK AND LUG WRENCH PLACEMENT DEVICE

CROSS REFERENCE TO RELATED APPLICATION

This application is a continuation-in-part of application Ser. No. 09/421,512 filed Oct. 20, 1999 now abandoned.

TECHNICAL FIELD

The present invention pertains to spare tire locking devices and more particularly to a device which includes a four way lug wrench locked in place to a vehicle or trailer and that can be positioned on top of a spare tire to prevent theft.

BACKGROUND ART

Many types of carriers have been used to provide an effective means to secure a spare tire to a vehicle or trailer. In the past, elaborate carriers have been developed that attach directly to the bed of a pickup truck or to a sidewall of a vehicle. A lug wrench is usually stored in a separate location in the vehicle or trailer, as it is an accessory. A four-way lug wrench has greater utility and has not been used in the past to prevent theft when employed in conjunction with a carrier.

A search of the pnor art did not disclose any patents that read directly on the claims of the instant invention, however the following U.S. patents are considered related:

| U.S. Pat. No. | Inventor | Issue Date |
| --- | --- | --- |
| 4,007,863 | Norris | Aug 5, 1975 |
| 3,865,291 | Tidwell | Feb 11, 1975 |
| 3,843,033 | Wirth | Oct 22, 1974 |
| 3,688,954 | Neal | Sep 11, 1972 |
| 3,613,972 | Daughhetee | Oct 19, 1971 |

Norris in U.S. Pat. No. 4,007,863 teaches an upright vertically extendible frame that include depending feet that rest upon the flooring of a pickup truck bed with a upper projecting abutment that engages the side wall of a pickup truck bed. A frame includes a clamp that engages the vehicle wheel and tire assembly against one side of the frame.

U.S. Pat. No. 3,865,291 issued to Tidwell is for a spare tire holder that includes an elongated spine provided with clamps for clamping its upper end to the top of a pickup truck bed side wall. The adjustable parts of the clamps are so located as to not interfere with the mounting of a camper in the bed of a pickup truck. Wheel securing arrangements fastened several sizes of truck wheels to the spines of the holder.

U.S. Pat. No. 3,843,033 of Wirth discloses a tire and wheel carrier mounted in a rack for a pickup truck. The carrier has a base that is mounted to the floor of the truck and includes a pair of spaced upright rods that are secured to a base element making it vertically adjustable relative to the base element. A top element is secured to the rods and also the overhanging flange of the truck bed. A holding unit secures the wheel and tire assembly to the rods in a protected and rigid manner.

Daughhetee in U.S. Pat. No. 3,613,972 teaches a spare tire bracket that is mounted on the rear end of a pickup truck or the trunk of an automobile. A support assembly is secured to the vehicle by an anchor and the invention includes a tire connector which is mountable to the wheel of a spare tire. The tire connector includes a yoke with a threaded member connected to a lock clamp that is removable when not in use.

For background purposes and as indicative of the art to which the invention is related reference may be made to the U.S. Pat. No. 3,688,954 issued to Neil on Sep. 11, 1972.

DISCLOSURE OF THE INVENTION

Spare tires are usually stored in wheelwells that are located in the trunk of automobiles and are protected by being inside the trun which has a deck lid lock. Due to the popularity of pick-up trucks, four-wheel drive sports utility vehicles and vans a new problem has emerged in many instances the spare tires are stored on the outside of the vehicle and as such is subject to theft if not protected by a lock. Another problem is that lug wrenches provided by the original equipment manufacturers are not particularly convenient to use. Four-way lug wrenches have been in use for decades and are easy to use due to a length that is easy to manipulate and robust in construction. Therefore, a primary object of the invention is to combine the need for spare tire protection with the storage and retention of a four-way lug wrench. This object is accomplished by the use of a locking device that is attached to the spare wheel carrier or directly to the vehicle and uses the lug wrench as a barrier preventing removal of the wheel unless unlocked by an authorized person.

An important object of the invention is realized as the exterior tire carriers have become more popular and the demand for such their protection is obviously prevalent. Furthermore, the entire market of trailers for boats, horses, and utility hauling has long been in use and has the same problems with external mounting of spare tires. The instant invention fills this long felt need by providing a convenient yet out of the way and secure place to store the four-way lug wrench and provide anti-thief protection for the spare tire at the same time. Four-way lug wrenches alone are not so expensive and therefore they do need to be secured, however, when one is required their usage is urgent and imperative, which again increasing the invention's desirability.

Another object of the invention is that its usage is almost universal as it will function with any wheel that has a standard bolt pattern since the locking mechanism is first attached to the vehicle spare tire carrier studs using a thin push nut to hold it in place. The actual tire size is of little importance as the wrench carrier is adjustable for tire width. This adjustability is important as tire sizes and rim diameters vary considerably in the industry and utility of the vehicle.

Still another object of the invention is that almost any four way wrench may be used with no modification required. In the United States, ⅝ inch drive wrenches have sockets to fit ¹¹⁄₁₆, ¾, ¹³⁄₁₆ and ⅞ inch bolts, while ¾ inch drive wrenches have sockets to fit ⅞, ¹⁵⁄₁₆, 1 and 1¹⁄₁₆ inch bolts. Metric sizes are also commonly available in the 17 to 22 mm sizes, all of which function properly with the invention.

Yet another object of the invention is its adaptability to fit most vehicle spare tire brackets. Since the original equipment manufacturers fabricate a bracket to fit the wheel rim, and most wheels in the industry are similar in construction, no modification is required. To use the invention, it is only necessary to install a slotted flange that is provided, between the bracket and the wheel hub. The flange is slotted to include a pattern that is designed to fit all vehicles using conventional bolt circles in their wheels. Further, if only the four-way wrench is to be stored and locked in place without the spare tire and rim, the invention may be mounted directly to a vehicle bulkhead or trailer wall by using a similar pre-drilled plate having no slots but a short threaded stud centered to accommodate the invention. The plate can be secured with conventional nuts and bolts or even self-tapping screws.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment mounted on a spare tire with the four way lug wrench securing the tire in place and the emblem plate removed for clarity.

FIG. 2 is a cross sectional view taken along lines 2—2 of FIG. 1 except the emblem plate is shown mounted in place.

FIG. 3 is a partial isometric view of the four way lug wrench carrier in the preferred embodiment shown removed from a vehicle or trailer with the emblem plate cut away for clarity.

FIG. 4 is a fragmentary cross-sectional view taken along lines 4—4 of FIG. 3 less the emblem plate.

FIG. 5 is a partial isometric view of the emblem plate completely removed from the invention for clarity.

FIG. 6 is a cross-sectional view taken along lines 6—6 of FIG. 5.

FIG. 7 is a partial isometric view of the padlock less the shackle.

FIG. 8 is a partial isometric view of the hollow square cover completely removed from the invention for clarity.

FIG. 9 is a cross-sectional view taken along lines 9—9 of FIG. 8 illustrating the padlock fastened inside the hollow of the cover.

FIG. 10 is a right end view of the hollow square cover completely removed from the invention for clarity.

FIG. 11 is a partial isometric view of the body completely removed from the invention for clarity.

FIG. 12 is a cross-sectional view taken along lines 12—12 of FIG. 11.

FIG. 13 is a right end view of the body completely removed from the invention for clarity.

FIG. 14 is a partial isometric view of rear of the slotted flange, completely removed from the invention for clarity.

FIG. 15 is a cross-sectional view taken along lines 15—15 of FIG. 14.

FIG. 16 is a right side view of the slotted flange completely removed from the invention for clarity.

FIG. 17 is an exploded view of the preferred embodiment with an optional longer grooved round threaded shaft shown in phantom relative to the favored length.

FIG. 18 is a fragmentary isometric view of the second embodiment with the padlock swiveled in an open position and the four way lug wrench in position in the round carrier body.

FIG. 19 is a fragmentary isometric view of the second embodiment with the padlock swiveled in a closed position less the four way lug wrench.

FIG. 20 is an arbitrary cross sectional view of the second embodiment as depicted in FIG. 18.

FIG. 22 is a fragmentary isometric view of the third embodiment with the four way lug wrench attached to a vehicle wall or bulkhead with a mounting plate.

FIG. 23 is a cross-sectional view taken along lines 23—23 of FIG. 22.

FIG. 24 is an exploded view of the third embodiment with the bulkhead mounting plate shown less mounting hardware and cut away to expose the stub shaft to view also the body and shackle attached together without the lug wrench.

FIG. 25 is a cross-sectional view taken along lines 25—25 of FIG. 24.

BEST MODE FOR CARRYING OUT THE INVENTION

Figure 21:
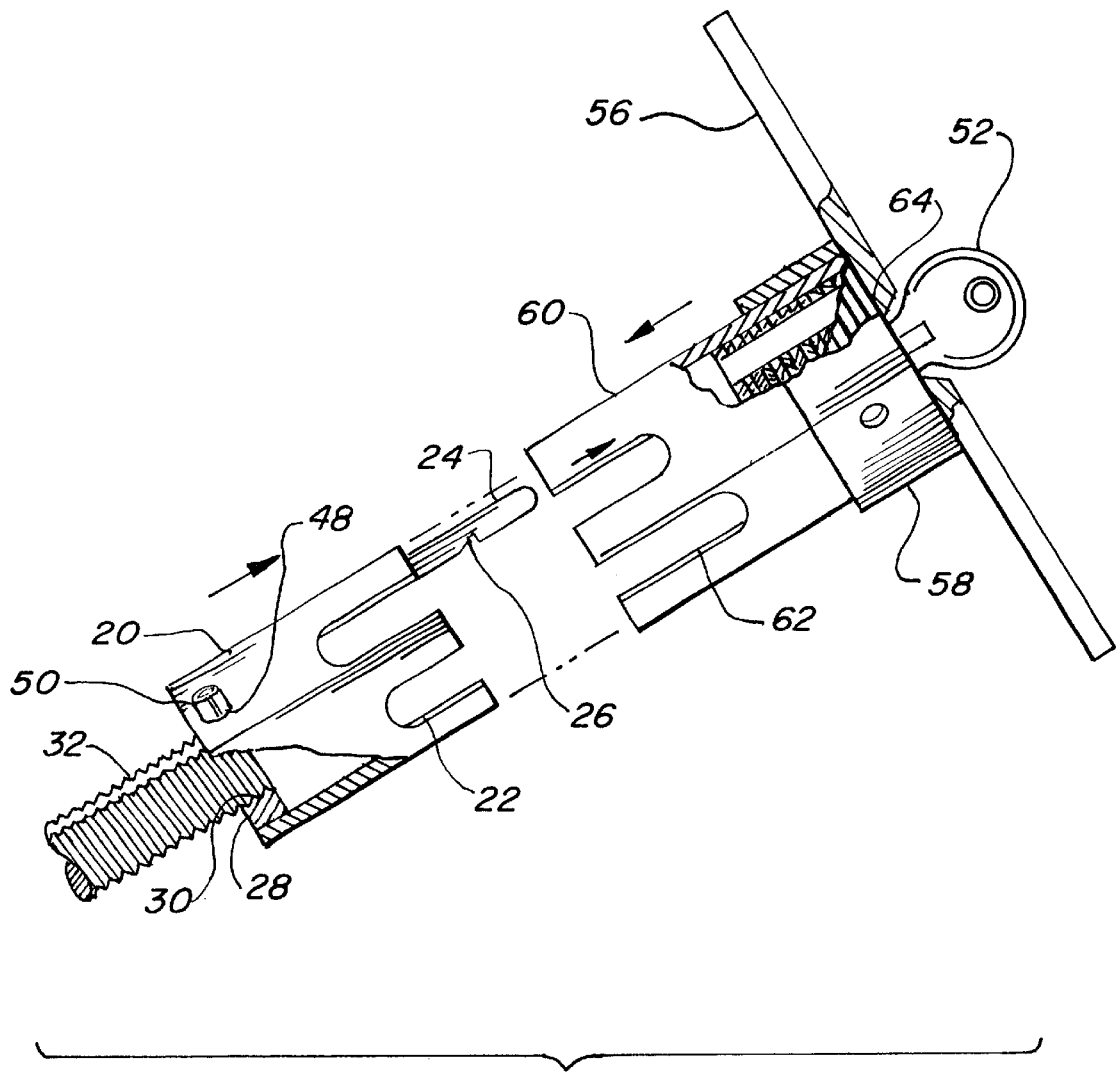
FIG. 21 is an exploded plan view of the preferred embodiment without the lug wrench, shown with the body and locking means separated to illustrate how the two pieces fit together.

The best mode for carrying out the invention is presented in terms of a preferred second and a third embodiment. The second embodiment differs in that the carrier body is round instead of square and the padlock uses its original shackle with the cover and emblem plate omitted otherwise the balance of the invention is identical. The third embodiment is for locking and storage of the wrench only mounted on a vehicle wall or bulkhead.

The preferred embodiment is shown in FIGS. 1 through 17 and is comprised of a hollow wrench carrier body 20 that includes four open ended slots 22 in the walls of the body in pairs matching the offset radius of a conventional four way lug wrench. The body 20, in its preferred construction, is rectangular in shape and formed of metal such as found in a steel square tube. A single separate shackle lock pin 24 is positioned within the hollow of the body at one corner and extends outwardly therefrom. The lock pin 24 is illustrated best in FIGS. 4, 11, 12 and 17 and is round and includes a notch 26 to be mated with a shackle-less padlock. The lock pin 24 is permanently attached to the body 20 with pins or welded as illustrated and preferably includes a head on one end with the other end beveled for convenience when introducing the pin into a padlock.

Attachment means include enclosing one end of the body 20 with a bottom 28 shown in FIGS. 3, 4, 11, 12 and 17 that is either welded in place, pinned or punch indented. The bottom 28 has a threaded bore 30 parallel to the shackle pin 24 in which a grooved round threaded shaft 32 is connected as illustrated best in FIGS. 11–13. The threaded shaft 32 is a conventional length of steel running thread with a key-way like longitudinal groove machined lengthwise through the threads. The actual length of the shaft 32 may vary with the particular type of vehicle to which the carrier is attached. It has been found that two lengths will cover almost all of the conventional vehicles with 3inches (7.62 cm) standard and a 4¹/₁₂ inch (11.43 cm) optional. The standard length is illustrated in FIGS. 2–4 along with 18–21 and the optional length is illustrated in phantom in the exploded view of FIG. 17.

A slotted flange assembly 34, consisting of a flat plate 36 with a female threaded boss 38 welded or machined in the center of the flat portion of the plate 36, is utilized to provide attachment to the motor vehicle or trailer. The threaded boss 38 may be any configuration on the outside as an example round is shown in FIGS. 3 and 17 and hexagonal is another choice illustrated in FIGS. 15 and 16, however, square or any other shape will function with equal ease. The flange assembly 34 is illustrated in FIGS. 2, 3 and 14–17 and includes a plurality of slots that are configured to mate with a vehicle or trailer spare tire bracket as shown best in FIG. 2. In most cases the spare tire bracket is equipped, by the original equipment manufacturer, with studs that are aligned to mate with the wheel hub permitting the user to bolt the wheel in place on the bracket with lug nuts in the same manner as on the vehicle. The flat plate 36 of the flange assembly 34 is slotted to match the bolt circle of the vehicle and as such since there are many and varied patterns in use today, it has been found that 9 slots are optimum as illustrated in FIGS. 3 and 14–16, however the two horizontal slots may easily be eliminated as shown in FIG. 17 and still fit the majority of vehicles on the road today. It may be also noted that a different pattern may be adopted such as 12 identical slots at equal angular displacement or even slots at varied spacing and dissimilar alignment will still fall within the scope of this invention.

It may be clearly visualized that the slotted flange may be assembled to a vehicle wheel carrier 40 by placing the flat plate 36 on the face of the carrier 40 with the studs penetrating through the slots. To hold the flange in place a push nut bolt retainer 42 is urged over the threaded portion of the stud and as it is thin and does not interfere with the connection, a spare vehicle tire and wheel 44 is then placed upon the studs with the wheel hub 46 contiguously engaging the flange assembly 34. When the lug nuts are tightened against the hub 46 the tire and wheel 44 is securely attached and the flat plate 36 of the flange assembly 34 is tightly sandwiched therebetween.

As previously discussed the round threaded shaft 32 is attached to the flange assembly 34 on one end and to the wrench carrier body 20 on the other, and the proper adjustment may be made by simply rotating the body 20 on the shaft 32. In order to lock the shaft in place, once the adjustment is made, a hole 48 is placed through the body 20 halfway through the bottom 28 and also halfway into the threaded boss 38 of the slotted flange assembly 34, thus penetrating into to the threads at right angles. When the adjustment is made, the grooves in the threaded shaft 32 are aligned with the holes 48 and a tension pin 50 is inserted within each hole and pressed, with slip joint pliers in place, until the pin engages the bottom of the longitudinal groove effectively locking the wrench carrier device in place.

In some instances the invention may be initially mounted directly to a wall or bulkhead when only the storage of a our-way lug wrench 54 is required or a wheel is to be relocated. To accomplish this utility, holes may be drilled in the vehicle wall or bulkhead and the predrified studded plate may be attached with conventional bolts and nuts or even self tapping screws through the existing holes.

Locking means for the invention consists of a hollow rectangular locking cover 60 having open ended slots 62 that are in mirror image with the slots 22 in the body 20. A shackle-less padlock 64 is permanently encased therein as shown in FIGS. 4 and 7–10. The padlock 64 may be of any type however a laminated steel padlock is ideal as it may be altered slightly on the outside surface to fit the inside of the hollow rectangular cover 60 without affecting the internal integrity of the lock. The normal U-shaped shackle may be removed and one of the shackle holes plugged if desired or if the fit is correct both holes may be used if the lock is the removable shackle type.

In use the invention is attached to the wheel carrier of the vehicle or trailer and the spare wheel is in place. A four way lug wrench 54 is inserted in the open ended slots 22 of the body 20 with the four ends of the wrench resting against, or near, the tire of the spare wheel. The locking cover 60 is placed over the shackle lock pin 24 and interfaces with the body captivating the wrench 54 between the slots 22 and reversed slots 62 securely holding the wrench in place. For removal a key 52 is inserted into the lock and the locking cover 60 with its integral lock is separated from the body 20 exposing the wrench 54.

To insure the integrity of the lock by covering its body and for esthetic purposes, an emblem plate 56 is attached to the wrench carrier body 20 using a retainer 58 that is molded as part of or welded to the plate in the center. The retainer is subsequently held in place over the body by welding, riveting or the like as illustrated in FIGS. 3 and 17. A beveled recess or countersunk hole is placed in the top center of the plate 56 to permit access to the key 52.

It should be noted that the wrench 54 may be any type, such a the inch type or metric sizing, however, it has been found that the ⅝ and ¾ inch diameter has proven to be ideal for the application.

The second embodiment of the invention is shown in FIGS. 18–20 and is basically the same as the preferred embodiment except a round metallic body 66 is used with a conventional padlock 68 that includes a U-shaped shackle 70 of the standard type. The shackle 70 is permanently affixed within the hollow round wrench carrier body 66 and is aligned between slots 22 provided that are the same as the preferred embodiment. The locking cover 60 along with its emblem plate 56 is not required as the case of the padlock 68 is utilized instead. In use, access is gained by unlocking the padlock 68 with an authorized key and then simply rotating the case out of the way freeing the four way lug wrench 54. When locked the padlock case is held tightly against the round body 66 captivating the wrench in the slots 22 achieving the desired securement.

The third embodiment is shown in FIGS. 22—25 and is used when the four way lug wrench is to be stored and locked in place on a vehicle wall or bulkhead by itself without the wheel and tire. The storage location may be inside the bed of a pickup truck either on the side or the front wall and if the device is to be located on a sports utility vehicle there are flat surfaces inside rear walls and even the rear door may be utilized for mounting. A trailer has many and varied locations that are suitable for mounting which are out of the way and inconspicuous.

In any event a bulkhead mounting plate 72 is used and is provided with a number of holes 74 that may be utilized to hold threaded fasteners such as nuts and bolts or self tapping screws. The bulkhead mounting plate 72 is shown by itself in FIGS. 24 and and consists of a flat plate that is preferably round however any configuration will function satisfactorily. The holes 74 are pre-drilled or punched either on a bolt circle or in a rectangular pattern as illustrated in FIG. 24. The reason that four holes 74 are illustrated is that basically only two are required however on a horizontal plane the lug wrench 54 may be made to be mounted as an "X" or a "+" by simply aligning two of the holes 74 horizontally. Other holes may be drilled at assembly to mate with existing structure in the vehicle, if desired. In the center of the plate 72 is a stub shaft 76 that is the same construction as the grooved round threaded shaft 32 except it is shorter in length an d permits the bottom 28 of the body 20 to butt against the plate 72 in a short coupled arrangement using the same attachment to the body with the tension pin 50 entering and compressing against the groove of the shaft 32. The stub shaft 76 is attached to the plate 72 by welding or threading or any other suitable method. In use the plate 72 is attached to the bulkhead or wall in a conventional manner with threaded fasteners and the body 20 is screwed in place with the pin 50 driven into contact with the groove in the shaft. The four way lug wrench 54 is positioned within the slots 22 and the locking cover 60 is slid over the body 20 and locked in place as described above. The key 52 releases the pin 24 and the cover may be removed for access to the four way lug wrench.

While the invention has been described in complete detail and pictorially shown in the accompanying drawings, it is not to be limited to such details, since many changes and modifications may be made in the invention without departing from the spirit and scope thereof hence, it is described to cover any and all modifications and forms which may come within the language and scope of the appended claims.

What is claimed is:

1. A spare tire lock and lug wrench placement device mountably attached to a motor vehicle or trailer for securing a four way lug wrench and also to safeguard a spare tire and wheel assembly from unauthorized removal utilizing the lug wrench as a protective restraint, comprising:
   a) a hollow wrench carrier body having a plurality of open ended slots therein,
   b) a shackle connected to and extending from the hollow within the wrench carrier body,
   c) attachment means adjustably joined to the hollow wrench carrier body for connection to motor vehicles or trailers, and
   d) locking means slideably fastened to the extending shackle for attachment and when locked, for the prevention of unauthorized removal,
   e) a four way lug wrench disposed within the open ended slots of the hollow wrench carrier body and secured in place by the locking means, for attachment of the wrench to motor vehicles and trailers also for retaining a spare wheel to said vehicle or trailer when the carrier body attachment means is connected to a vehicle or trailer spare tire carrier and bulkhead.

2. The device as recited in claim 1 wherein said hollow wrench carrier body is rectangular in shape and formed of metal.

3. The device as recited in claim 2 wherein said shackle is a single separate lock pin positioned within a corner of the hollow rectangular wrench carrier body.

4. The device as recited in claim 1 wherein said attachment means further comprising,
   a) said carrier body having a threaded bore within the body, parallel to the shackle,
   b) a slotted flange having a female threaded boss attached thereunto, with the slots configured to mate with a vehicle or trailer spare tire bracket, and
   c) a round threaded shaft connected to the bore of the body and also the threaded boss, providing linear adjustment relative to a tire width and depth when the flange is fastened to a vehicle or trailer tire carrier.

5. The device as recited in claim 4 wherein said round threaded shaft further having a longitudinal groove therein for locking the shaft in place when adjusted relative to a tire width and depth.

6. The device as recited in claim 5 wherein said wrench carrier body and the slotted flange having a female threaded boss attached thereunto, each further having a hole into the respective threaded bore and threaded boss at right angles to the threads, and, a tension pin disposed within each hole contiguously engaging the longitudinal groove in the shaft, for retainment of the wrench carrier body to a motor vehicle or trailer.

7. The device as recited in claim 1 wherein said locking means further comprising a hollow rectangular locking cover with a shackle-less padlock permanently encased therein, with, said locking cover slideably disposed over said hollow rectangular wrench carrier body and said lock pin penetrating said padlock achieving protection and only permitting removal by the utilization of an authorized key.

8. The device as recited in claim 1 wherein said hollow wrench carrier body is round in shape and formed of metal.

9. The device as recited in claim 8 wherein said shackle is integral with a padlock.

10. The device as recited in claim 9 wherein said locking means is a padlock having a U shaped shackle with the shackle permanently affixed within the hollow round wrench carrier body and aligned between said slots, further affording removal of the four way lug wrench only by utilizing an authorized key for unlocking and rotating the lock case away from the hollow inside the round carrier body.

11. The device as recited in claim 1 wherein said four way lug wrench is the so called ⅝ inch diameter type.

12. The device as recited in claim 1 wherein said four way lug wrench is the so called ¾ inch diameter type.

13. A spare tire lock and lug wrench placement device removably attached to a motor vehicle or trailer for mountably securing a four way lug wrench to safeguard it from unauthorized removal, comprising:
   a) a rectangular hollow wrench carrier body having a plurality of open ended slots therein,
   b) a separate lock pin shackle connected inside the corner of and extending from the hollow within the wrench carrier body,
   c) locking means slideably fastened to the extending shackle and when locked for the prevention of unauthorized removal,
   d) attachment means defined by, a bulkhead mounting plate having a stub shaft, connected to motor vehicle or trailer, joined to the hollow wrench carrier body with the stub shaft, and
   e) a four way lug wrench disposed within the open ended slots of the hollow wrench carrier body and secured in place by the locking means, for attachment of the wrench to a motor vehicle or trailer.

14. The device as recited in claim 13 wherein said bulkhead mounting plate further having a plurality of mounting holes therethrough for mounting in a compressible manner to a vehicle or trailer bulkhead with threaded fasteners.

15. A spare tire lock and lug wrench placement device removably attached to a motor vehicle or trailer for mountably securing a four way lug wrench and also to safeguard a spare tire and wheel assembly from unauthorized removal utilizing the lug wrench as a protective restraint, comprising:
   a) a body having a plurality of open ended slots therein,
   b) a shackle connected to and extending from said body,
   c) locking means slideably attached to the shackle for the prevention of unauthorized removal,
   d) attachment shaft means joined to the body for connection to motor vehicles and trailers, and
   e) a four way lug wrench disposed within the slots of the body and secured in place by the locking means, for attachment of the wrench to motor vehicles and trailers also for retaining a spare wheel to said vehicle or trailer when the carrier body attachment means are connected to a vehicle or trailer bulkhead and spare tire carrier.

* * * * *